(12) United States Patent
Spradlin

(10) Patent No.: US 8,541,487 B2
(45) Date of Patent: Sep. 24, 2013

(54) MATERIALS, METHODS AND COMPOSITIONS FOR A COMPOSITE BUILDING MATERIAL

(76) Inventor: Ranee Spradlin, Mouton, TX (US)

(*) Notice: Subject to any disclaimer, the term of this patent is extended or adjusted under 35 U.S.C. 154(b) by 17 days.

(21) Appl. No.: 13/236,281

(22) Filed: Sep. 19, 2011

(65) Prior Publication Data

US 2012/0010332 A1 Jan. 12, 2012

Related U.S. Application Data

(63) Continuation-in-part of application No. 12/534,376, filed on Aug. 3, 2009, now abandoned.

(60) Provisional application No. 61/086,058, filed on Aug. 4, 2008.

(51) Int. Cl.
*C08K 11/00* (2006.01)

(52) U.S. Cl.
USPC .......................................................... 524/15

(58) Field of Classification Search
USPC .......................................................... 524/15
See application file for complete search history.

(56) References Cited

U.S. PATENT DOCUMENTS

| | | | | | |
|---|---|---|---|---|---|
| 2,885,380 | A | * | 5/1959 | Elarde | 523/414 |
| 2,938,937 | A | * | 5/1960 | Shenk | 523/218 |
| 4,070,314 | A | * | 1/1978 | Alexander et al. | 524/14 |
| 4,663,397 | A | | 5/1987 | Morita | |
| 4,806,161 | A | * | 2/1989 | Fabiny et al. | 106/14.12 |
| 5,134,179 | A | | 7/1992 | Felegi | |
| 6,448,324 | B1 | | 9/2002 | Nodera | |

OTHER PUBLICATIONS

Williamson, R. V., et al., "Agricultural Residue Flours as Extenders in Phenol Resin Glues for Plywood," Modern Plastics, Oct. 1949, pp. 111, 112, and 169-174.*
Pandey, S.N., et al., "Production of Particle Boards from Cottonseed Hulls," Agricultural Wastes, 1985, 13, 287-293.*

* cited by examiner

*Primary Examiner* — Liam Heincer
*Assistant Examiner* — Nicholas Hill
(74) *Attorney, Agent, or Firm* — Matthew E. Burr

(57) ABSTRACT

A solid composite material is suitable for construction and industrial uses. The solid composite material consists of at least an effective amount of assorted agricultural remnants with additives of calcium carbonate and antimony trioxide bound in an effective volume of cured resin. The cured material tolerates wet environments, is fire resistant, resistant to caustic substances and can be finished to provide a product having a desired appearance.

5 Claims, 1 Drawing Sheet

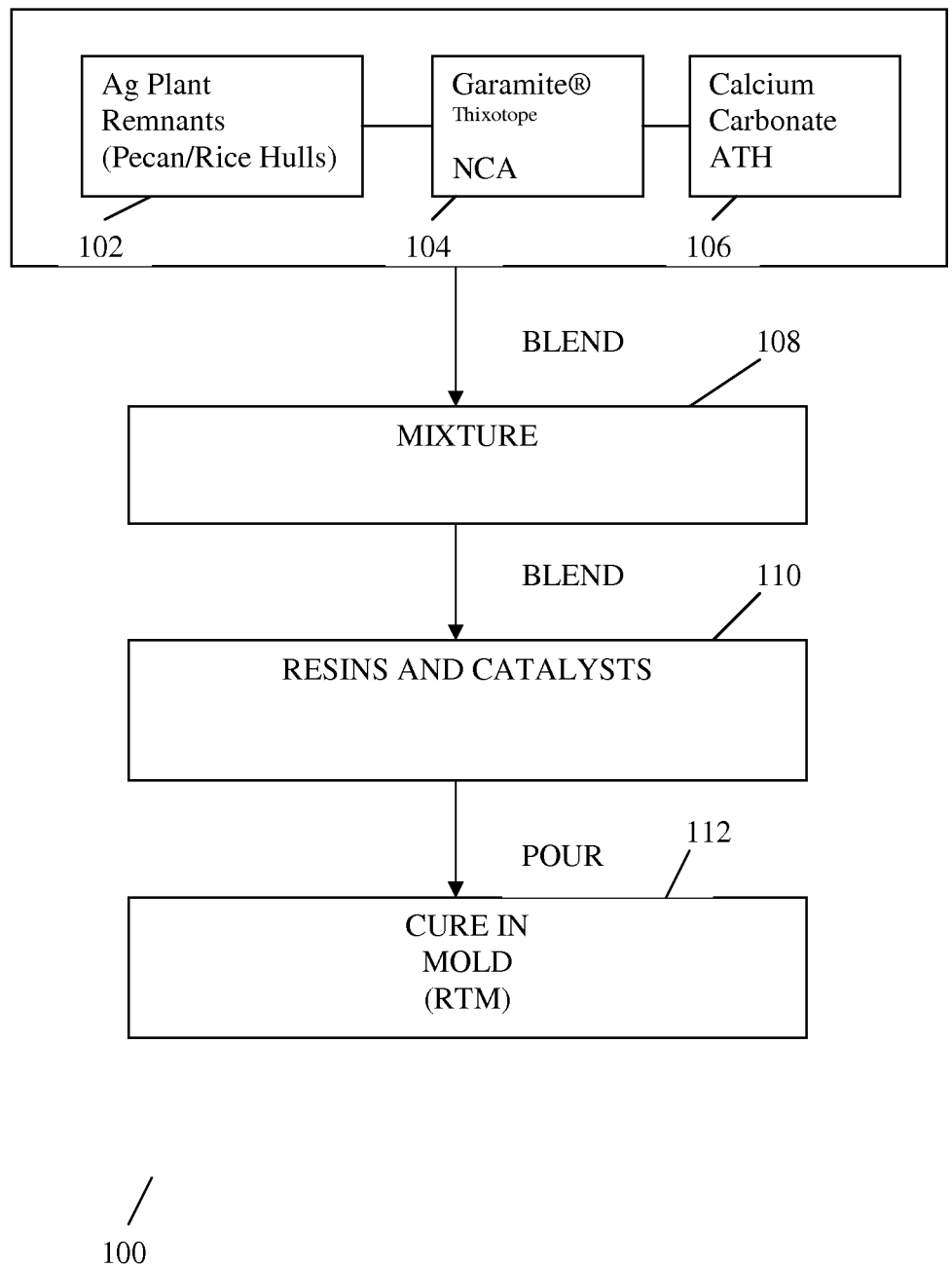

MATERIALS, METHODS AND COMPOSITIONS FOR A COMPOSITE BUILDING MATERIAL

CROSS-REFERENCE TO RELATED APPLICATIONS

This application is a continuation-in-part of, claims priority from and the benefit of the United States Patent Application by the same inventor, Ser. No. 12/534,376 of the same title and filed on Aug. 3, 2009, now abandoned which claims priority from provisional U.S. Patent Application 61/086,058, by the same inventor and filed Aug. 4, 2008, the disclosures of which applications are incorporated herein by reference.

TECHNICAL FIELD

This disclosure relates generally to manufactured materials, and in particular to composite materials manufactured from polyester resins and plant remnants.

BACKGROUND

Composite panels are usually made of wood, agriculture or other fibers by a manufacturing process leading to a production of panels in the form of hardboard, oriented strand board, fiber board siding, wafer board, medium density fiber board, particle board, and other similar boards. Typically, wood is the preferred fiber. The panels or boards are made by mixing fiber and a binder and then placing the mixture in a hot press. Wood-fiber based composites are sensitive to moisture, particularly moisture in a liquid form. In addition to linear expansion and thickness swell, moisture can cause blistering and fiber-pop at the panel surface. Since fiberboard is often painted or coated, especially for decorative use, blistering and fiber-pop become important issues, especially when using water based topcoats or adhesives. Tempering is often employed to yield a strong surface layer that gives added strength, especially to doorskins used in the manufacturing of doors. During building construction or transport of the finished composite, structural panels are often exposed to weather elements before they are protected by a siding or roofing. Severe weather can cause water damage to unprotected panels in a very short period of time. To protect the paneling during the construction process, a tempering topcoat is sometimes applied to the panel's surfaces to provide them with a hard, moisture resistant surface.

Usually, the process of manufacturing these composite panels includes a use of a tempering oil which is applied to the surfaces of the panel in order to impart a smooth, strong, and water resistant surface thereto. However the manufacturing technology often requires a high temperature bake oven in order to cure the tempering oil after it has been applied to the surface of the panel.

The above described processes have numerous drawbacks, including the release of VOCs, hazardous air pollutants (HAPs), and styrenes. The cost of energy for hot presses or ovens to cure the resins or shape the boards and the carbon emissions from the generation of the energy are additional considerations that motivate seeking an alternative way to make composite building materials.

Although wood continues to be a favored material for boards, and even though wood is one of the most successful renewable resources, the fact is that there simply are not enough big trees in world to satisfy the demand for boards from solid wood. Therefore, smaller trees are chipped and the chips combined with resins and other ingredients to make composite boards in order to meet demand.

Other construction materials may be derived from wood, or projects use alternative materials such as, for example, concrete, plastic, or steel. Each material has certain advantages and disadvantages in its manufacturing process, financial costs, or performance characteristics.

There is a need therefore, for a manufactured composite building material that does not rely primarily on wood and that does not require heat curing or pressing and that emits minimal pollutants and other undesirable by-products of manufacture; and which can be finished into a wide variety of appearances for household and industrial uses.

SUMMARY

A manufactured material useful for a variety of household and industrial purposes is made from plant remnants bound in a cured resin. The plant remnants consist of, for example, cottonseed husks, cotton plant stems, cotton plant leaves, wheat stems, soy plant stems, pecan shells, and walnut shells, combined with a resin and utilized as a construction material. The cured material is derived from combining agricultural waste, calcium carbonate ($CaCO_3$, sometimes referred to herein as Light Weight or LT), and epoxy resin to form a cured composite having high tensile, compression, and flexural strength without heat curing.

Preferred embodiments of the present composite material are manufactured as a plant remnant blend (raw state), mixed with a polyester resin, and cured with an accelerator, commonly referred to as Methyl ethyl ketone peroxide (MEKP). The final product can be utilized in a variety of projects ranging from residential to industrial applications. Some examples of utilization include, but are not limited to, wall inserts, concrete alternatives (foundations, walls, roadway pavements and bridge supports), Green roofs, curb stops, household countertops, pavestones and any projects requiring structurally sound materials.

Materials of the present disclosure advantageously provided ecological or so-called "green" alternatives to concrete and particle board overutilization. The product can be recycled and utilized over and over. The composite material of the present disclosure combines many features of material performance (strength of steel), flexibility (plastic/wood), and can be utilized as an interior/exterior product (resistant to weather).

Plant remnants such as pecan shells and rice hulls, instead of wood chips as is typical in the art, provide a substrate for the manufacture of objects such as composite boards and other shapes for use in building construction and industrial uses such a bridges. Mixing such plant remnants with a suitable resin such as a polyester resin catalyzed by Methyl ethyl ketone peroxide (MEKP) as known in the art yields a mixture that cures at room temperature (68-90 degrees Fahrenheit). Alternative specific embodiments utilize epoxy or plastic resin. The uncured mixture may be poured into a mold to be cured and shaped into any desired form such as, for example, a counter top, school desk top, vanity top and the like. The cured material is finished to provide the desired appearance and texture.

The plant remnants react with the liquid resin efficiently to produce an amorphous interwoven matrix of resin-coated fibers, with the consequence that relatively little resin is required as compared with the amounts of resin typically used for wood chip particle board. A further advantage over wood is that the present mixture is not moisture sensitive and does not need to be dried prior to curing. Yet the fully cured composite mixture displays remarkable strength and stability making it a useful building material. The ability of the composite mixture to cure in a mold at room temperature allows the composite to be put to a wide variety of uses.

The pre-cured material in a liquid state can be poured into molds in a wide variety of shapes and then be finished after curing into a wide variety of appearances, including appearing to be concrete, marble, granite, stone, linoleum, tile, wood grains and so forth.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 1 is a schematic illustration of a process flow of a specific embodiment for a composition of the present disclosure.

DETAILED DESCRIPTION

Referring to FIG. 1, the reference numeral 100 generally designates a process embodying features of a specific embodiment of the present disclosure. The process 100 includes providing an effective amount of post-harvest plant remnants 102 such as cottonseed husk remnants, rice hull remnants and pecan shell remnants. Such plant materials are generally farm and agricultural remnants. For the purpose of this disclosure, the phrase "agricultural remnants" and "plant remnants" are used interchangeably and refer to non-wood plant materials, to distinguish the plant materials of the present disclosure from the wood chips used in particle board and the like. Furthermore, the plant remnants preferably are fiberous with an average fiber length sufficient to provide a 3-dimensional amorphous weave or matrix of cross-hatched fibers. Such may be distinguished from compositions in which the plant components are processed into flour or powder prior to combination with a resin.

Thickeners 104 such as and Non-Chloride Accelerator (NCA) are provided. Additionally, additives 106 such as calcium carbonate ("LT") and antimony trioxide (ATH) in 60% solution by volume may be provided. No special handling, storage or transportation expense is required.

For example, the dry mix may constitute the following effective approximate amounts:
Cottonseed husk remnants—1 to 3 lbs
Pecan shell remnants—1.0 lbs
Rice seed hulls or peanut shell remnants—6 oz
Wheat remnants—>1 oz
Non-Chloride Accelerator (NCA)—8 oz
Antimony Trioxide (ATH)—9.03 oz
Calcium Carbonate ($CACO_3$) [Light Weight (LT)]—9 lbs
Alternative embodiments may selectively incorporate effective amounts of the following components: plastics such as for example Polyetheretherketone (PEEK), poly(ethylene terephthalate) (PETE or PET), and Polytetrafluoroethylene (PTFE or Teflon®) and combinations thereof; recycled plastics; soy bean remnants; fiber glass matting; E-glass; Q-cells; minerals such as for example talc, cobalt, titanium dioxide, graphite, hydrocal clay, and wollastonite; thixotropes, as well as pigments or colorings such as food coloring and so forth.

Plant remnants 102 as described above may be blended with polyester resins 108 such as unsaturated polyester resin in styrene. Polyester resins may be introduced in the approximate effective amount of 3.5 to 4 lbs for the above amounts of dry mix. Preferably, MEKP is introduced in a proportion of approximately 0.75% of the mixture by volume to achieve the desired state of equilibrium. Dry pigment may be added if desired in amounts of approximately ½ cup or 4 oz, for example. Blending maybe accomplished by mechanical means with a blender or by hand with blending paddles. The final weight of batch with dry mix and resins from the above recipe is in the range of approximately 15 lbs to approximately 17 lbs.

The cottonseed husks in a raw state are the foundation of the substrate. Cottonseed husks generate natural strands that are structurally similar to fiberglass, a material known for its strong cross-hatched matrix weave of fiber strands. To this base is added three types of pecan shells and other agricultural farm fill remnants. For example, pecans from Texas include native, papershell and mayham varieties. Farm fill plant remnants may include but are not limited to cottonseed husks, rice hulls, peanut shells, soybean husks, and maze.

Through a mechanical process such as a commercial mixer, plant remnants are mixed with resin and begin a self-catalyzed anastomose reaction that binds the mixture into a composite. When blended correctly, the dry blend will clump. The clumped mixture is preferred prior to introducing the MEKP to catalyze curing.

The mixture takes on its own matrix characteristics as the viscosity increases during stirring. The addition of ATH imparts fire retarding properties and assists in the concentration of the (isophthalic) polyester resin 108. The addition of an effective amount of MEKP accelerates the catalyst to preferred levels and catalyzes the resin 110. Mixing generates heat which elevates to a peak and then stabilizes as the resin/plant remnant mixture cures into a fixed or hardened state.

The composite mixture of plant remnants and activated resin may be molded to a desired form prior to curing of the resin. For example, the mixture may be molded to be a kitchen counter top, vanity table top, or even a building structural support such as a wall or partition. The molds for such purpose may utilize release agents such as automobile wax compounds which are preferably applied to the surface of the mold three times for ten minute periods each. The repeated applications allow the wax to set up a barrier that will not allow the composite mixture to break through and adhere to mold.

Resin Transfer Molding (RTM) 112 accomplishes the curing of the product formula without the application of external heat. RTM 112 is a molding process that involves the transfer of the catalyzed resin/remnant mixture to an at least partially enclosed mold and allowed to cure within the mold, preferably at room temperature. That is, without the application of heat to the mold. Preferably the interior surfaces of the mold have been wax treated as described above to facilitate removal of the cured shape after curing. Upon completion of curing within the mold, the mold may be opened and the cured composite product may be removed for further processing. RTM 112 molds may be hinged or otherwise openable for easy opening and re-use or, alternatively, some types of molds may have to be shattered to remove the cured product.

RTM 112 may be performed at ordinary pressures but, as specifications may demand, may alternatively be performed under high applied pressure or partial vacuum low pressure. A breather material may be utilized to provide a path for the release of entrapped air from the resin during the curing process, particularly under regular or high pressure curing. Such a breather, for example, may be a loose woven material such as burlap or gauze that does not come in contact with the resin/plant remnant mixture and which extends from the interior of the mold to an outlet vent of the mold facilitate the escape of gas that might otherwise cause undesirable bubbles in the mixture.

The curing process does not require external heat. The product typically does not blister and so generally reliably produces surfaces that can be treated and used for a great variety of purposes. For counter tops and the like, for example, a smooth, cleanable surface is preferred.

Additives to obtain particular properties include but are not limited to e-glass, for example, to achieve a tack free state that the industry calls "B Staging." Additives such as catalyst inhibitors, flame retardants and others as described herein may be introduced to obtain specific end-use properties and improve the over all processing, and handling characteristics of the product.

It is noted that in the method of preparing the present composite, blending the mixture to clumping is not advised in the conventional wisdom of the industry because it is believed to indicate that the dry components are not being evenly wetted by the liquid resin. Surprisingly, in the present methods, however, clumping of the mixture is desired.

Conventional wisdom in the industry also advises against using a composite of plant remnants in humid or wet environments because it is thought that the water is absorbed by the plant matter, thereby weakening the composite material. The present composite material, however, is suitable for use in wet environments such as a bathroom or kitchen counter top, displaying a surprising result from what would be expected.

The mixture of the plant remnants in the mixer combines the material into a woven matrix in which the plant remnants are oriented randomly and create a cross-hatched weave of increased strength when bound in the cured resin. The finish product achieves surprising strength as measured in a variety of ways. The following section summarizes the test methods and results regarding the materials characterization of three different composite boards of the present disclosure. Provided herein are a brief description of the test methods as well as a summary of the results obtained.

Strength Testing Results

Material and Specimen Geometry

Testing was performed in two separate phases. Tensile strength testing was performed on three samples while compression and flexural testing was performed on four different composite boards. Three boards were rectangular (machined) and one board was circular. Specimen geometry was dictated by the appropriate American Society for Testing and Materials (ASTM) Standard with a total of three replicate tests performed per each test type (18 total tests). The thickness was evaluated during this effort with no thickness alteration. Prior to testing, all specimens were dimensionally measured for subsequent post-test calculations. The tensile testing was performed per ASTM D638 with a tensile "dog-bone" geometry utilized during the effort. Compression testing utilized square 2-in. by 2-in. "pucks" excised from the supplied composite boards and was performed in the spirit of ASTM D695. Lastly, the flexural testing (ASTM D790) utilized 2-in. wide strips cut nominally 16-in. long from the boards. Overall, it is important to note that the relative size of each coupon was substantially larger than any constituent making up the composite boards; this is crucial when evaluating the material properties to gain a global behavior.

Test Procedures

Given the unique nature of these materials, testing was performed in the spirit of the previously mentioned standards. A best effort was made to test to the associated standards.

Tensile testing utilized a servohydraulic test frame with hydraulic clamping grips used to secure each end of the specimen during loading (FIG. 4). Testing was performed at a constant displacement rate of 0.5-in./min. Data, needed for post-test processing, included continuous load and displacement voltage. At the conclusion of testing, the data were processed to determine the ultimate strength for each specimen tested.

The compression and flexural testing utilized an electromechanical test frame with the required fixturing integrated into the frame. With regards to the compression testing, opposing steel platens were used with the specimen placed between each during testing. Testing was concluded upon catastrophic failure. During each test, continuous data was recorded for each test and subsequently analyzed to determine the compressive strength. The flexural testing utilized a 4-point configuration with the ultimate goal in determining the flexural properties for the three different composite boards. Testing was concluded upon specimen failure. All testing was performed in lab-ambient conditions; nominally 72° F. and 30-50% RH. No controlled conditioning was performed prior to testing. Each board had ample time to fully cure.

Results

Tensile

The results of the tensile testing are presented in Table 1. When comparing the three composite boards associated with this test effort, the average tensile strengths are comparable at near 1,200 psi. Board #2 demonstrated the highest average strength at 1,283 psi, with Board #3 demonstrating the lowest at 1,145 psi.

Compression

The compressive strength results are presented in Table 2. Similar to the tensile results, the compression strengths are on average at 6,804 psi. As with the tensile test results, Board #1 demonstrated the highest compressive strength at 8,030 psi.

Flexural

The flexural properties for each board are presented in Table 3. While the flexural strengths are relatively close with regards to the three boards, there appears to be an inherent difference in flexural strength, with Board #4 having the highest flexural strength at 2,864 psi and Board #1 having the lowest at 2,260 psi.

The overall response of the four boards characterized indicates the tensile strengths, compressive strengths, and flexural strengths are nominally similar for each condition. The flexural tests demonstrated the most spread when comparing the three boards, but overall the strength values were comparable.

TABLE 1

Summary of tensile results.

| Material ID | Specimen ID | Thickness, in. | Width, in. | Failure Load, lb | Failure Stress, psi | Average Failure Stress, psi |
|---|---|---|---|---|---|---|
| 1 | T-1-1 | 0.8650 | 0.8310 | 731.0 | 1,017.0 | 1,195 |
|   | T-1-2 | 0.9095 | 0.8185 | 723.6 | 971.9 |   |
|   | T-1-3 | 0.8670 | 0.8155 | 1115.5 | 1,596.1 |   |

TABLE 1-continued

Summary of tensile results.

| Material ID | Specimen ID | Thickness, in. | Width, in. | Failure Load, lb | Failure Stress, psi | Average Failure Stress, psi |
|---|---|---|---|---|---|---|
| 2 | T-2-1 | 0.8655 | 0.8305 | 918.5 | 1,277.8 | 1,283 |
|   | T-2-2 | 0.8630 | 0.8355 | 972.0 | 1,348.1 |   |
|   | T-2-3 | 0.8405 | 0.8255 | 848.5 | 1,222.9 |   |
| 3 | T-3-1 | 0.8590 | 0.8280 | 886.5 | 1,246.4 | 1,145 |
|   | T-3-2 | 0.8895 | 0.8215 | 857.5 | 1,173.5 |   |
|   | T-3-3 | 0.8445 | 0.8270 | 708.0 | 1,013.7 |   |

TABLE 2

Summary of compressive strengths for compressive testing.

| Specimen ID | Condition | Cross-section | Maximum Compressive Stress, psi |
|---|---|---|---|
| C1 | Machined | Rectangular | 8,030 |
| C2 |   |   | 7,250 |
| C3 |   |   | 5,132 |
| C4 | Preformed | Circular | 5,500 |

TABLE 3

Summary of flexural testing results.

| Specimen ID | Condition | Modulus of Rupture/ Maximum Stress, psi |
|---|---|---|
| Flex-1 | Machined | 2,260 |
| Flex-2 |   | 2,644 |
| Flex-3 |   | 2,549 |
| Flex-4 | Preformed | 2,866 |
| Flex-5 |   | 2,691 |

On the basis of the test results, a specimen of an exemplary embodiment of the cured composite of the present disclosure exhibits greater mechanical strength than a comparable weight of concrete, standard particle board or strand board. Indeed, the strength of the present material was so great it broke the testing equipment in one test. Yet the present material is substantially lighter than the same volume of concrete.

Fire Testing

Additional testing was performed by the present inventor. For example, to analyze the product's response to fire, a fully cured specimen was soaked in gasoline (petrol) for twenty four (24) hours and then ignited. The integrity of the product was observed and recorded.

In the first such test, the specimen soaked in gasoline for one week and was then placed into a metal trash can lid and sprayed with a fire starter to enhance ignition. Once ignited the specimen was sprayed with fire starter until a well define flame formed. The flame was maintained for approximately 20 minutes. Alternatively, the gasoline was ignited by depositing a flaming napkin on the gasoline-soaked specimen.

Another fire test consisted of exposing a fully cured specimen to blow torch at approximately 1400 degrees Fahrenheit for five minutes.

In each case, no cracking, no blistering, no off gassing as vapors, and no brittleness was observed in the specimen. After the gasoline burned off the product did not appear to have shrunk (although no measurements were made) or dry out. No cracking of the product was seen and it was cool to the touch. The product did show signs of smoke damage which may be an artifact of Total Petroleum Hydrocarbon (TPH) remnants.

A further fire test was performed to try to ignite the dry product by placing it directly five inches above a flame and twisting it between the fingers to see what reaction would take place. The dry mixture did not spark or ignite. This results suggests that the product could withstand oxygenate heat transformations and may be useful as a fuel intake conduit.

Bleach Testing

The present inventor also tested the product with bleach by soaking a fully cured specimen in 20 ounces of household bleach in a stainless steel container overnight. The product was observed the next day after soaking approximately 19 hours. The initial observation was the specimen had not shrunk or swelled. It was also observed that some flecks of the plant remnant material along the surface appeared to be loosened or to have come off to be floating in the bleach. The specimen was otherwise still in tact.

The specimen was checked again approximately nine hours later. More pecan remnants and the like appeared to have sloughed off the surface but the specimen showed no blistering. This particular test sample contained PTFE, which was intact in concentrated particles. The bleach took on a darkened color from the pecans in the specimen. The specimen was dropped from a height of approximately 3 feet and did not break.

Bleach is a caustic substance that attacks organic matter. It also weakens cellulose fibers from lignin (a complex polymer and the chief non-carbohydrate constituent of wood. Lignin binds to cellulose fibers to harden and strengthen cell walls of plants). Accordingly, bleach may break down the heartstone portion of wood into pulp. In the specimen the bleach appeared to affect the dihydroxy alcohols of the resins. Other than loosening the outer surface of plant remnants (pecans), the plant portion of the product held up to the beach exposure. This is surprising in view of bleach's known ability to degrade wood.

Sulfuric Acid Testing

In addition to bleach, the present inventor tested the product with another caustic substance, namely sulfuric acid. A specimen was immersed for eight hours in 20 ounces of approximately 40% v/v sulfuric acid solution in a five gallon bucket.

Observation of the specimen after eight hours yielded essentially the same results as with the bleach. The specimen likewise did not break after being dropped from approximately three feet.

The composite material of the present disclosure may be formed into a great variety objects because the pre-cured liquid mixture can be poured in a mold having any desired shape. Furthermore, the components of the mixture can be varied so that the cured product resembles granite, marble, concrete and many other familiar construction and industrial materials. Like marble and granite, a cured product from the composite material can be polished to a high gloss for decorative uses. However, unlike stone materials, a product of the present composition weighs much less than stone of the same size, is easier to transport and is less brittle than stone.

Cured composite products of the present disclosure may be used in house construction as, for example kitchen and bathroom countertop material. Indeed, entire houses or buildings could be manufactured from products formed from the present composite material. An important use of the cured composite is as roofing material to provide buildings and dwellings with strong, light-weight and, most significantly, light-colored roofs. Traditional roofs are often weatherproofed with black tar and dark-colored weather shingles and the like, which contribute to local environmental warming, which in turn may lead to increased atmospheric greenhouse gases from increased energy production for air-conditioning and other climate control measures. Green building practices are increasingly moving toward light-colored roof materials as a way to save energy and reduce greenhouse gases in the atmosphere.

Other uses include parking bumper blocks, road barriers and traffic dividers. In fact road surfaces, particularly for bridges or over passes can be made from the present composite material with significant advantages over concrete and asphalt. For instance, a block manufactured from the composite material for use as a segment of bridge road surface can be formed with gratings, slots and the like to channel water and other run off for improved driving surface conditions. A significant advantage of using the present composite material as a road or bridge surface is that run off contaminants are greatly reduced and less hazardous than are run off contaminants from concrete and asphalt.

The present composite material can be recycled. For example, excess or discarded amounts of the cured composite may be ground down in chips or particles which are added into a virgin mixture where it simply becomes another component of the mixture that is poured into a mold and cured to form an object. Another form of recycling the composite is to add chips and particles of discarded composite back into the fields of farmers as a form of mulch.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A solid composite material suitable for industrial and household uses, the material comprising an effective amount of assorted non-wood, fiberous agricultural remnants and effective amounts of additives comprising calcium carbonate and antimony trioxide, bound in an effective volume of cured resin, the assorted non-wood, fiberous agricultural remnants comprising:
   cottonseed husk remnants;
   pecan shell remnants;
   rice seed hull remnants;
   peanut shell;
   soy bean remnants;
   wheat remnants;
   effective amounts of one or more additional components selected from the following: recycled plastics; fiber glass matting; E-glass and Q-cells; and
   effective amounts of one or more additional additives selected from the following: talc, cobalt, titanium dioxide, graphite, hydrocal clay, and wollastonite, wherein the non-wood, fiberous agricultural remnants have an average fiber length sufficient to provide a three-dimensional amorphous weave.

2. The composite material of claim 1, wherein the resin comprises a polyester resin.

3. The composite material of claim 1, wherein the additives further comprise one or more selected thixotropes.

4. The composite material of claim 1, wherein the additives further comprise one or more selected pigments.

5. A solid composite material resistant to fire and caustic substances and suitable for industrial and household uses, the material comprising an effective amount of assorted non-wood, fiberous agricultural remnants and effective amounts of additives comprising calcium carbonate and antimony trioxide, bound in an effective volume of cured resin, the assorted non-wood, fiberous agricultural remnants comprising:
   cottonseed husk remnants;
   pecan shell remnants;
   rice seed hull remnants;
   soy bean remnants;
   wheat remnants;
   effective amounts of one or more additional components selected from the following: recycled plastics; fiber glass matting; E-glass and Q-cells; and
   effective amounts of one or more additional additives selected from the following: talc, cobalt, titanium dioxide, graphite, hydrocal clay, and wollastonite,
whereby the solid composite material does not ignite upon exposure to temperatures up to 1400° Fahrenheit for five minutes and does not blister upon immersion in household bleach or a 40% v/v sulfuric acid solution for up to 8 hours, wherein the non-wood, fiberous agricultural remnants have an average fiber length sufficient to provide a three-dimensional amorphous weave.

* * * * *